United States Patent
Bonfiglio et al.

(10) Patent No.: US 11,117,200 B2
(45) Date of Patent: Sep. 14, 2021

(54) DRILLS AND METHODS OF USING THE SAME

(71) Applicant: KYOCERA SGS PRECISION TOOLS, INC., Munroe Falls, OH (US)

(72) Inventors: Douglas P. Bonfiglio, Clinton, OH (US); Steve Curtician, Canton, OH (US); Brian Hamil, Mogadore, OH (US)

(73) Assignee: KYOCERA SGS PRECISION TOOLS, INC., Munroe Falls, OH (US)

( * ) Notice: Subject to any disclaimer, the term of this patent is extended or adjusted under 35 U.S.C. 154(b) by 0 days.

(21) Appl. No.: 16/343,515

(22) PCT Filed: Oct. 20, 2017

(86) PCT No.: PCT/US2017/057646
§ 371 (c)(1),
(2) Date: Apr. 19, 2019

(87) PCT Pub. No.: WO2018/075921
PCT Pub. Date: Apr. 26, 2018

(65) Prior Publication Data
US 2019/0262910 A1    Aug. 29, 2019

Related U.S. Application Data

(60) Provisional application No. 62/410,894, filed on Oct. 21, 2016.

(51) Int. Cl.
*B23B 51/02*    (2006.01)

(52) U.S. Cl.
CPC .......... *B23B 51/02* (2013.01); *B23B 2251/18* (2013.01); *B23B 2251/202* (2013.01); *Y10T 408/9097* (2015.01)

(58) Field of Classification Search
CPC .......................... B23B 51/02; B23B 2251/18
See application file for complete search history.

(56) References Cited

U.S. PATENT DOCUMENTS

| 2,778,252 A | 1/1957 | Oxford, Jr. |
| 4,642,942 A | 2/1987 | Guhring |

(Continued)

FOREIGN PATENT DOCUMENTS

| DE | 19602566 A1 * | 7/1997 | ............. B23B 51/02 |
| EP | 2390028 A1 * | 11/2011 | ............. B23B 51/02 |

(Continued)

OTHER PUBLICATIONS

International Search Report and Written Opinion of the International Search Authority for International Application No. PCT/US2017/057646 dated May 2, 2019. International Filing Date Oct. 20, 2017. Agnes Wittmann-Regis, Authorized officer. Forms PCT/IB/326, PCT/IB/373, and PCT/ISA/237. 9 pages.

(Continued)

*Primary Examiner* — Eric A. Gates
(74) *Attorney, Agent, or Firm* — Vorys, Sater, Seymour and Pease LLP; Scott M. Guttman

(57) ABSTRACT

Drills and methods of removing material using drills are disclosed. Drills may include a plurality of lands that extend to a cutting edge, where adjacent lands are separated by flutes comprising a base contour arranged in a generally helical configuration along a centerline axis of a drill body. The drill also includes a plurality of contoured drill points each having a linear portion that extends towards an outer diameter of the drill body, and an arcuate portion that extends from the linear portion and towards a chisel of the drill body. The drill further includes a plurality of gash contours positioned within the plurality of flutes. The gash (Continued)

contours extend from the chisel of the drill body, and the gash contours are oblique to the base contours of the flutes.

21 Claims, 4 Drawing Sheets

(56) References Cited

U.S. PATENT DOCUMENTS

| | | | |
|---|---|---|---|
| 4,688,972 A | | 8/1987 | Kubota |
| 5,011,342 A | | 4/1991 | Hsu |
| 5,273,380 A | * | 12/1993 | Musacchia ............... B23B 51/02 |
| | | | 408/227 |
| 5,442,979 A | | 8/1995 | Hsu |
| 5,486,075 A | | 1/1996 | Nakamura et al. |
| 5,788,559 A | | 8/1998 | Jungnitsch |
| 5,807,039 A | | 9/1998 | Booher et al. |
| 5,823,602 A | | 10/1998 | Kelman et al. |
| 5,971,674 A | | 10/1999 | Holley |
| 6,071,046 A | * | 6/2000 | Hecht ..................... B23B 51/02 |
| | | | 408/225 |
| 6,132,149 A | | 10/2000 | Howarth et al. |
| 6,435,780 B1 | | 8/2002 | Flynn |
| 6,676,342 B2 | | 1/2004 | Mast et al. |
| 6,916,139 B2 | | 7/2005 | Yanagida et al. |
| 7,267,514 B2 | | 9/2007 | Wetzl et al. |
| 7,476,067 B2 | | 1/2009 | Borschert |
| 7,530,772 B2 | | 5/2009 | Reinhardt et al. |
| 7,950,881 B2 | | 5/2011 | Stokey et al. |
| 8,061,938 B2 | * | 11/2011 | Sampath ................. B23B 51/02 |
| | | | 408/230 |
| 8,206,067 B2 | | 6/2012 | Turrini |
| 8,292,555 B2 | | 10/2012 | Shaffer |
| 8,540,463 B2 | | 9/2013 | Goulbourne |
| 8,579,557 B2 | | 11/2013 | Arai et al. |
| 9,114,461 B2 | | 8/2015 | Olsson |
| 9,333,564 B2 | | 5/2016 | Santamarina et al. |
| 2006/0039767 A1 | | 2/2006 | Yamamoto et al. |
| 2011/0085868 A1 | * | 4/2011 | Harouche ............... B23B 51/02 |
| | | | 408/229 |
| 2016/0059323 A1 | | 3/2016 | Reister |
| 2016/0214184 A1 | * | 7/2016 | Krenzer ................. B23B 51/02 |

FOREIGN PATENT DOCUMENTS

| | | |
|---|---|---|
| EP | 2441544 A1 | 4/2012 |
| WO | 2004082874 A1 | 9/2004 |

OTHER PUBLICATIONS

Ace. Web Thinning of Twist Drills. Date of publication Oct. 31, 2016. http://acedrill.com/techdocs/webthinningoftwistdrills.pdf.

Drill Grinding Procedures: Web Thinning. Year 2002. https://www.wisc-online.com/search?searchType=1&q=drill+grinding+procedures%3A++Web+Thinning. Note: This reference is from the year 2002 but we do not know the specific date (month and day) on which it was published. However, this reference is sufficiently earlier than the effective U.S. filing date so that the particular month of publication is not in issue.

Robert Maxey. High Performance Twist Drills in Perspective. Modern Machine Shop. https://www.mmsonline.com/articles/high-performance-twist-drills-in-perspective. Jun. 15, 1999.

* cited by examiner

DRILLS AND METHODS OF USING THE SAME

CROSS-REFERENCE TO RELATED APPLICATIONS

This Patent Application claims priority to and the benefit of International Patent Application No. PCT/US2017/057646 filed Oct. 20, 2017, and U.S. Provisional Patent Application Ser. No. 62/410,894 filed Oct. 21, 2016, which are incorporated by reference herein in their entirety.

TECHNICAL FIELD

The present disclosure is directed to drills and methods of making the same and, in particular, drills having contoured drill points to modify chip generation during a material removal operation.

BACKGROUND

Drills are used across a variety of industries in material removal operations to form cylindrical holes into workpieces. A conventional twist drill includes a cylindrical drill body that includes at least one helical flute that defines at least one fluted land. The fluted land terminates at cutting edge, which typically exhibits a conical-shape. In general, material is removed from the workpiece by plunging a portion of the drill into the workpiece while the drill is rotated. The cutting point and the portion of the fluted lands that are positioned proximate to the cutting point shear the material of the workpiece, forming a chip. The chip is evacuated out of the newly-formed hole in the workpiece through the helical flute.

Conventional drills have been designed to mitigate factors of the material removal operation, including tool life, axial pressure applied to the drill, torque applied to the drill, heat generated during the material removal operation, geometric condition and surface finish of the cylindrical hole formed by the drill, and dimensional position of the cylindrical hole formed by the drill. Improvement in these parameters may be desired to reduce cost associated with the material removal operation, decrease the tolerance in hole placement across the workpiece, or improve the geometric condition or surface finish of the hole.

Accordingly, drills having elements that improve characteristics of a material removal operation may be desired.

SUMMARY

In one embodiment, a drill includes a plurality of lands that extend to a cutting edge, where adjacent lands are separated by flutes comprising a base contour arranged in a generally helical configuration along a centerline axis of a drill body. The drill also includes a plurality of contoured drill points each having a linear portion that extends towards an outer diameter of the drill body, and an arcuate portion that extends from the linear portion and towards a chisel of the drill body. The linear portion and the arcuate portion are evaluated along a plane that passes through the centerline axis of the drill body. The drill further includes a plurality of gash contours positioned within the plurality of flutes. The gash contours extend from the chisel of the drill body, and the gash contours are oblique to the base contours of the flutes.

In another embodiment, a method of removing material from a workpiece includes plunging a drill into the workpiece, where the drill includes a plurality of lands that extend to a cutting edge, where adjacent lands are separated by flutes comprising a base contour arranged in a generally helical configuration along a centerline axis of a drill body. The drill also includes a plurality of contoured drill points each having a linear portion that extends towards an outer diameter of the drill body, and an arcuate portion that extends from the linear portion and towards a chisel of the drill body. The linear portion and the arcuate portion are evaluated along a plane that passes through the centerline axis of the drill body. The drill further includes a plurality of gash contours positioned within the plurality of flutes. The gash contours extend from the chisel of the drill body, and the gash contours are oblique to the base contours of the flutes. The method of removing material also includes forming a first chip configuration with a portion of the cutting lip formed by the gash contours and the contoured drill points, and forming a second chip configuration with a portion of the cutting lip formed by the base contours and the contoured drill points.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of drills having contoured drill points. The drills include a drill body having a plurality of lands that extend to a cutting edge. The adjacent lands are separated from one another by flutes. Each of the flutes includes a base contour that is arranged in a generally helical configuration about a centerline axis of the drill body. The drills include a plurality of contoured drill points arranged along the cutting edge of the drill body, and also include a chisel that is arranged proximate to the centerline axis of the drill body. The drill points extend from an outer diameter of the drill to the chisel of the drill. The contoured drill points include a linear portion that extends towards an outer diameter of the drill and an arcuate portion that extends from the linear portion towards the chisel of the drill. The linear portion and the arcuate portion of the contoured drill points may be tangent with one another. The linearity and curvature of the respective linear and arcuate portions may be evaluated along a plane that passes through the centerline axis of the drill body. The drill may also include a gash contour that is positioned within at least one of the plurality of flutes. The gash contour extends from the chisel of the drill and may be oblique to the base contour of the flutes. Various embodiments of drills having contoured drill points will be described in more detail herein.

Material removal operations using conventional drill bits may involve tool pressures, surface finish conditions, tool wear, heat generation, dimensional inaccuracy, or combinations thereof that are undesirable. Such conditions may be exacerbated as material removal rates are increased, for example, to accommodate production volumes. The present disclosure is directed to drills that include elements that may improve the conditions experienced in material removal operations by modifying the chip creation and chip evacuation methodology of the drill as compared to conventional drills. Elements that may be included on drills include a contoured drill point and an extended gash contour that is positioned along the lands of the drill. Drills according to the present disclosure that incorporate such elements may modify the method of chip generation, such that cutting forces and temperatures at the workpiece are reduced as compared to conventional drills. Further, holes produced by the drills may exhibit improved geometric conditions, positional tolerance, and/or surface condition.

As used herein, the term "about" means plus or minus 10% of the numerical value of the number with which it is being used. Therefore, "about 40" means "in the range of 36 to 44."

Figure 1:
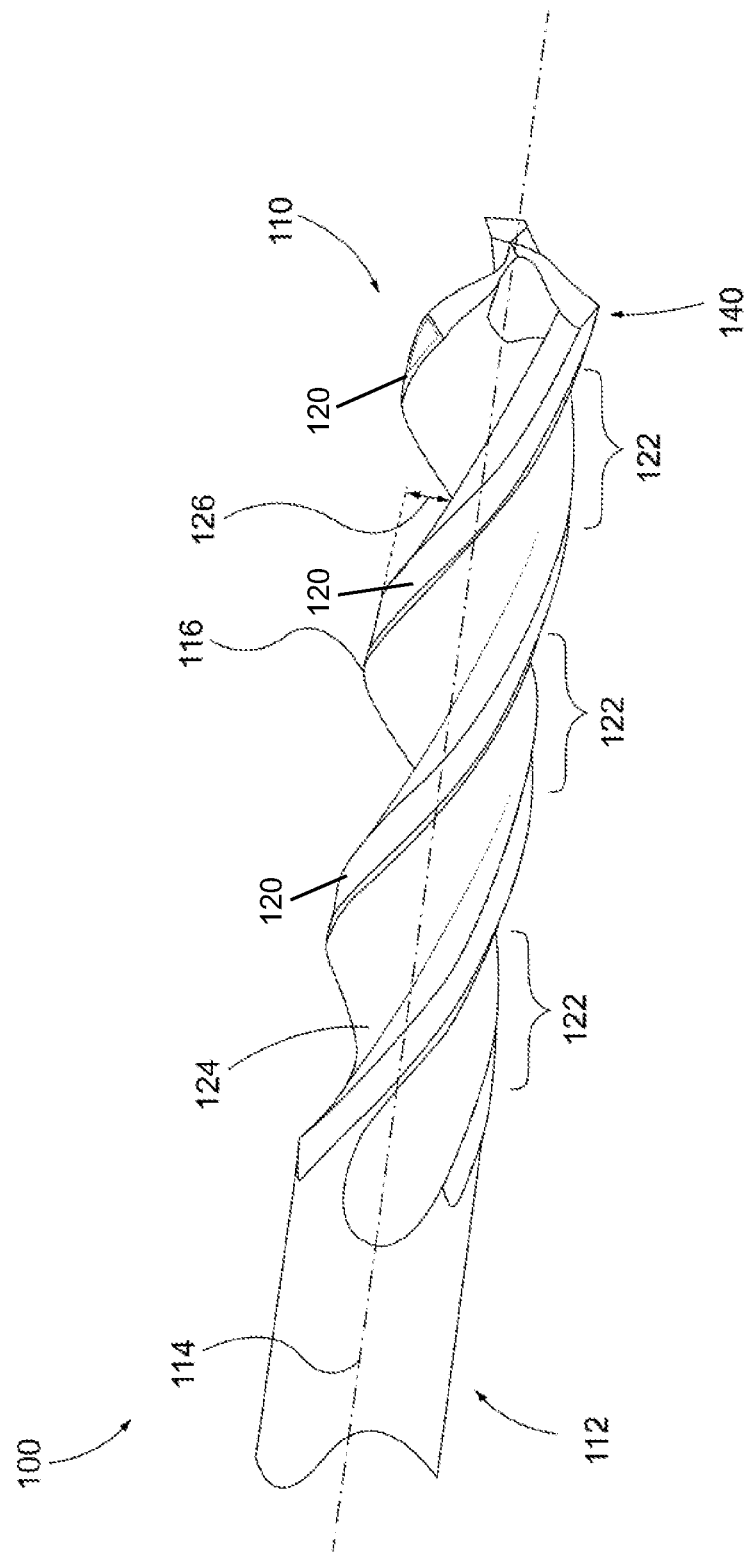
FIG. 1 depicts a side perspective view of a drill according to one or more embodiments shown or described herein.

Referring now to FIG. 1, one embodiment of a drill 100 is depicted. The drill 100 includes a drill body 110 and a shank 112 that is proximal to the drill body 110. The drill body 110 includes a plurality of lands 120 that extend to a cutting edge 140. In the depicted embodiment, the drill body 110 includes three lands 120; however, in other embodiments the drill body 110 may include more or less than three lands 120. Each of the lands 120 is separated from adjacent lands 120 by one or more flutes 122. The flutes 122 include a base contour 124 that is arranged in a generally helical orientation along and about a centerline axis 114 of the drill body 110. In some embodiments, the flutes 122 may extend to a depth 126 from an outer diameter 116 of the drill body 110 at positions proximate to the cutting edge 140. The depth 126 of the flutes 122 may decrease at positions about the centerline axis 114 that are distal to the cutting edge 140, such that the flutes 122 runout relative to the drill body 110 at positions that are distal to the cutting edge 140.

Figure 2:
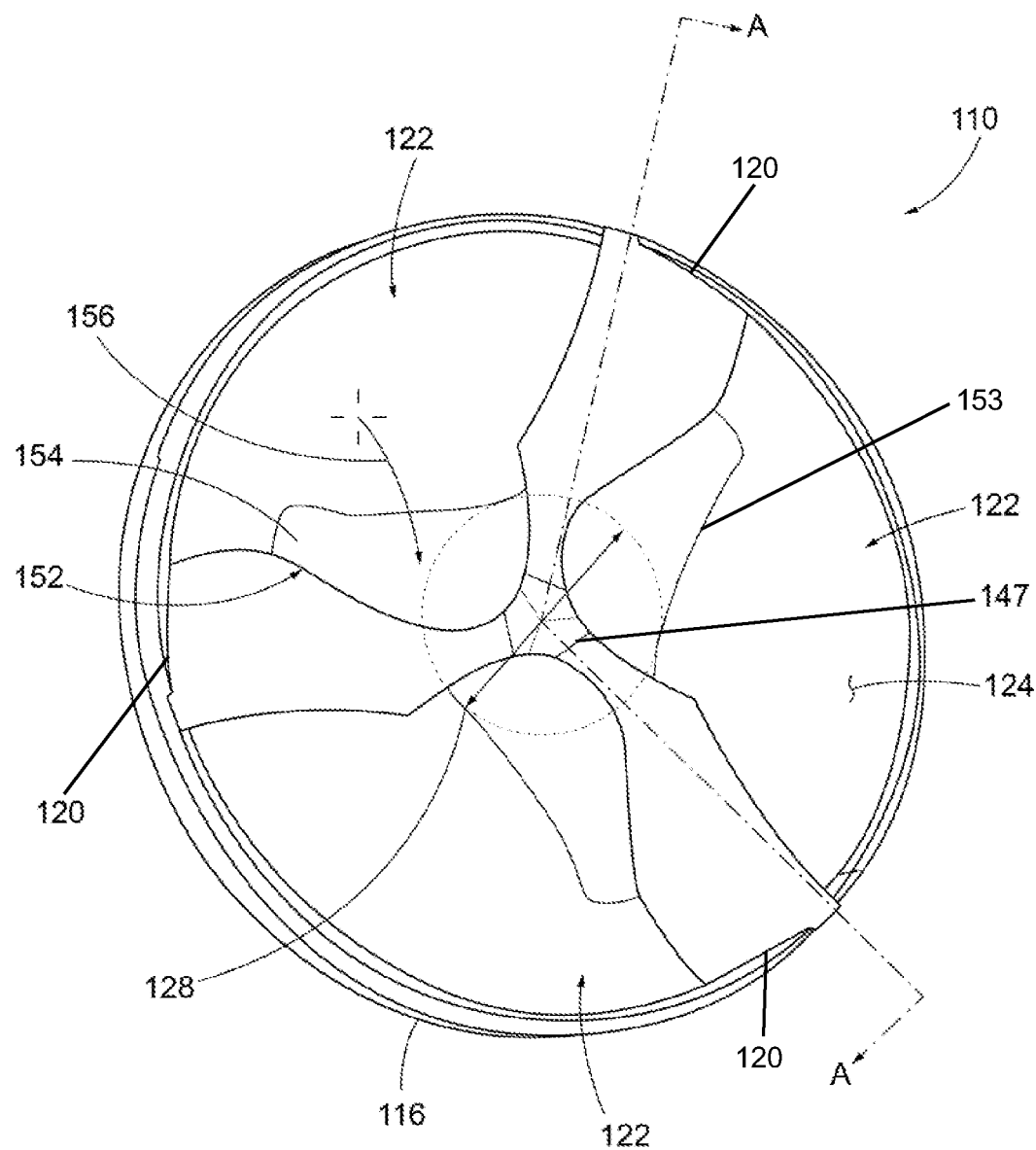
FIG. 2 depicts an end perspective view of a drill according to one or more embodiments shown or described herein.

Referring now to FIG. 2, the relative positioning of the flutes 122 around the drill body 110 form a web 128. As is conventionally understood, the web 128 is the portion of the drill body 110 that remains when the flutes 122 runout along the drill body 110 as described above. The web 128 provides the drill 100 with much of its torsional strength. Therefore, modifying the base contour 124 of the flutes 122 to reduce the size of the lands 120 increases clearance of the drill body 110 for chip evacuation, but may also reduce the torsional strength of the drill body 110.

Figure 3:
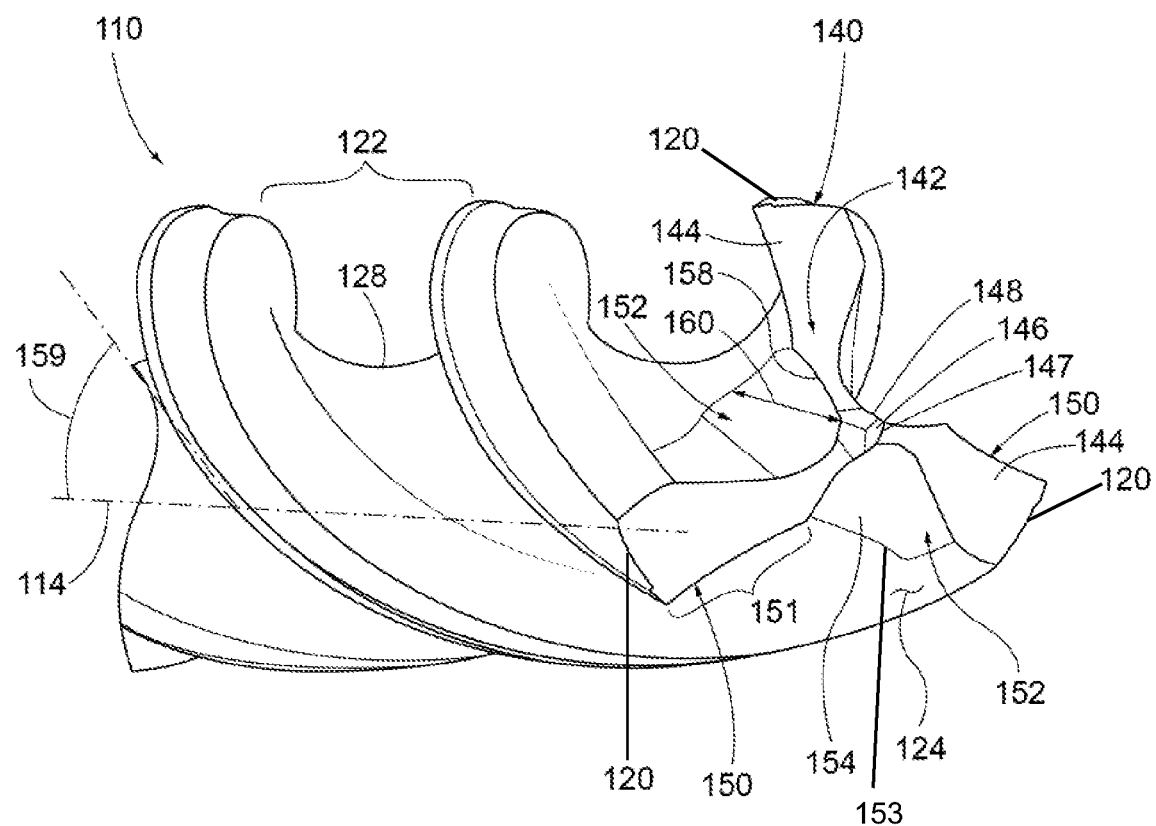
FIG. 3 depicts a detailed side perspective view of a drill according to one or more embodiments shown or described herein.

Referring now to FIG. 3, the cutting edge 140 of the drill 100 is shown in greater detail. As can be seen in FIG. 3, the cutting edge 140 includes a contoured drill point 142. The contoured drill point 142 includes a linear portion 144 that extends from the outer diameter 116 of the drill body 110 towards the centerline axis 114 of the drill body 110. The contoured drill point 142 also includes an arcuate portion 146 that extends from the linear portion 144 to a chisel 148. In the depicted embodiment, the linear portion 144 and the arcuate portion 146 are tangent to one another, and intersect at a transition 147. In other embodiments, the linear portion 144 and the arcuate portion 146 may be non-tangent with one another, such that the linear portion 144 and the arcuate portion 146 define a facet at the point of transition 147, In the depicted embodiment, the chisel 148 is formed from the convergence of all of the arcuate portions 146 that are associated with the plurality of lands 120.

Figure 4:
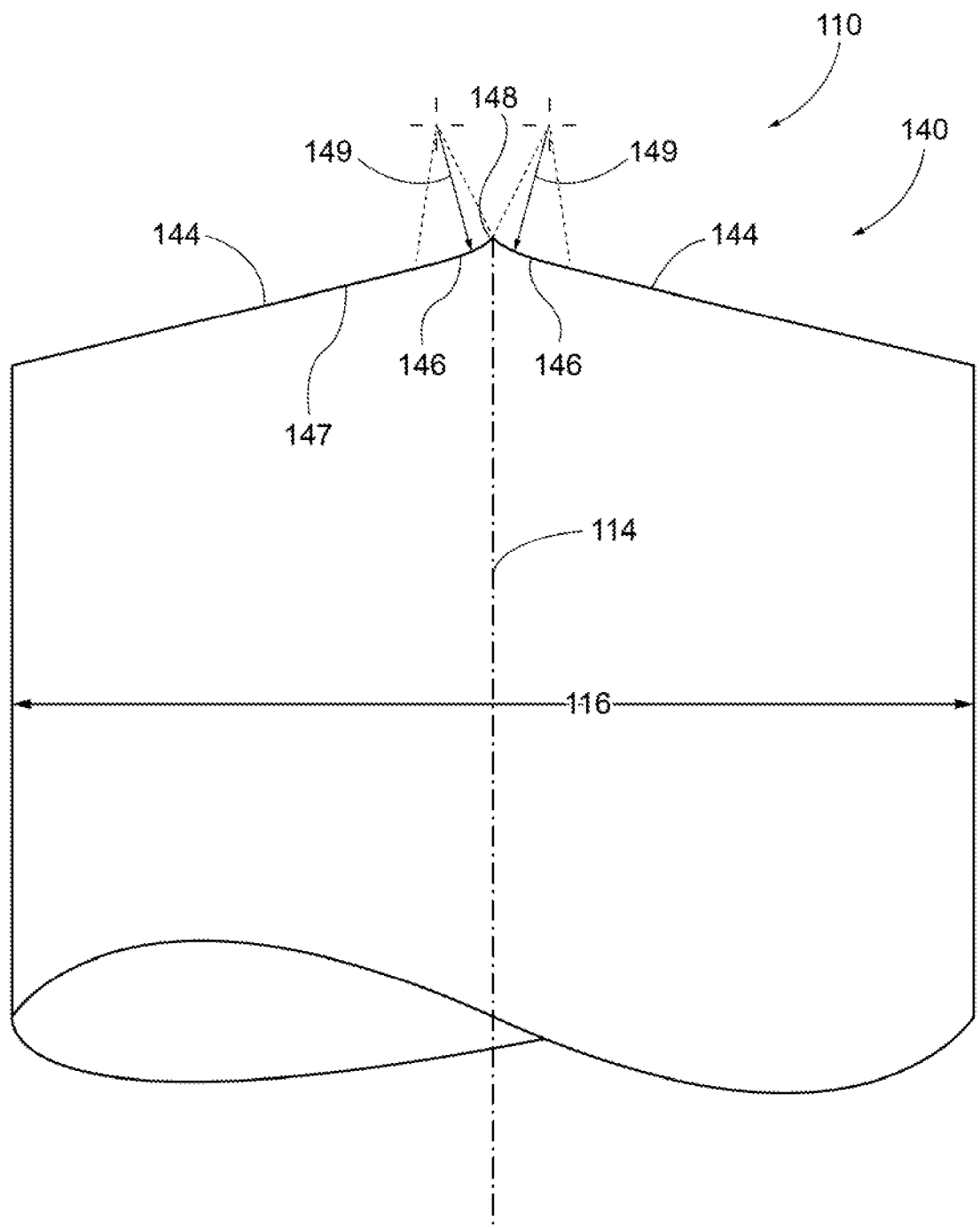
FIG. 4 depicts a detailed cross-sectional view of the drill of FIG. 2, shown along cutting plane A-A.

It should be understood that the contoured drill point 142 may exhibit a generally conical configuration having an axis of symmetry that may correspond to the centerline axis 114 of the drill body 110. The linear portions 144 and the arcuate portions 146, therefore, together may exhibit generally conical configurations. However, when evaluated along a plane that passes through the centerline axis 114 of the drill body 110 (see FIG. 4, which is a planar cross-sectional view of the drill 100 shown along section A-A, as depicted in FIG. 2), the linear portion 144 exhibits a linear cross-section and the arcuate portion 146 exhibits an arcuate cross-section.

The sizes and configuration of the arcuate portion 146 may be selected based upon the material of the workpiece in which a hole will be made as well as the parameters of the material removal operation. In various embodiments, the size and position of the arcuate portion 146 may be determined relative to the outer diameter 116 of the drill body 110. In same embodiments, the arcuate portion 146 may follow a radius 149. The radius 149 can be selected to provide the desired performance of the drill 100 in the material removal operation.

In various embodiments, the radius 149 may be in a range from about 6% of the outer diameter 116 of the drill 100 to about 25% of the diameter 116 of the drill 100, including being in a range from about 8% of the outer diameter 116 of the drill 100 to about 18% of the outer diameter 116 of the drill 100. In one example, the radius 149 is about 13% of the outer diameter 116 of the drill 100. The arcuate portion 144 may extend from about 5° to about 15° of the outer diameter 116 of the drill 100, including extending from about 5° to about 10°.

Referring again to FIG. 3, the drill body 110 may include a cutting lip 150 that is positioned at the cutting edge 140 of the drill body 110, and is formed between the intersection of the contoured drill point 142 and the lands 120 of the drill body 110. In various embodiments, the cutting lip 150 may exhibit linear or curved orientations when evaluated down the centerline axis 114 of the drill body 110. The configuration of the cutting lip 150 is determined, in general, by the base contour 124 of the flutes 122. If the regions of the base contour 124 at radial positions outward from the centerline axis 114 of the drill body 110 are curved, the cutting lip 150 will generally be curved as well.

Referring collectively to FIGS. 2 and 3, the drill body 110 may include a web thinned region 152 at positions of the web 128 that are positioned proximate to the cutting edge 140. The web thinned region 152 may exhibit a variety of configurations in which portions of the web 128 are locally removed at axial positions proximate to the cutting edge 140. In the illustrated embodiment, the web thinned region 152 exhibits a gash contour 154, in which material of the web 128 that is positioned towards the cutting lip 150 and material that is positioned away from the cutting lip 150, relative to the centerline axis 114 of the drill body 110, is removed. The incorporation of the web thinned region 152 may leave an unthinned length 151 along the cutting lip 150 that extends between the outer diameter 116 of the drill 100 and a facet 153 created between base contour 124 and the gash contour 154 of the land 120. In the illustrated embodiment, the unthinned length 151 of the cutting lip 150 has a thickness that may range from about a thickness of the web 128 to about 10% of the thickness of the web 128, and in one example, the thickness of the unthinned length 151 is about equal to the thickness of the web 128.

Without being bound by theory, incorporation of the web thinned region 152 into a drill body 110 may reduce a length of the chisel 148, which in turn may reduce the requisite axial force that is applied to the drill 100 during a material removal operation. Further, the incorporation of the web thinned region 152 may improve chip removal from the hole formed in the workpiece during the material removal operation.

As illustrated in FIG. 2, the gash contour 154 exhibits a gash radius 156 that may be in a range from about 6% to about 25% of the outer diameter 116 of the drill body 110, including being in a range from about 8% to about 18% of the outer diameter 116 of the drill 100. In one example, the gash radius 156 is about 13% of the outer diameter 116 of the drill 100.

In the depicted embodiment, the gash contour 154 is also positioned such that the unthinned length 151 of the cutting lip 150 (that is formed by the gash contour 154 and the base contour 124) is radially positioned outside of the transition 147 that is formed between the linear and arcuate portions 144,146 of the contoured drill point 142. However, in other embodiments, the gash contour 154 may be positioned such that the unthinned length 151 of the cutting lip 150 is radially positioned inside of the transition 147 such that it is closer to the chisel 148.

The size and positioning of the gash contour 154 may be modified to suit the requirements of a particular end-user application. In some embodiments, the gash contour 154 may be formed into the base contour 124 between lands 120 at an axial rake 158 from the helical configuration of the flutes 122. For example, the flutes 122 may be formed with a helical angle 159 of about 30° relative to the centerline axis 114 of the drill body 110. As conventionally understood, the helical angle 159 may be measured by drawing a line parallel to the centerline axis 116 of the drill body 110 and an edge of the land 120. In some embodiments, the axial rake 158 of the gash contour 154 is in a range from about 5° to about 30° relative to the centerline axis 114 of the drill body 110, including being in a range from about 5° to about 14°. In one example, the axial rake 158 is about 9° from the centerline axis 114 of the drill body 110. Stated differently, the gash contour 154 may be formed at an angle that is in a range that from about 25° to about parallel with the base contour 124 of the lands 120, for example being in a range from about 25° to about 16°; and in one example embodiment, the gash contour 154 may be formed at an angle that is about 21° from the base contour 124 of the lands 120.

While embodiments of the present disclosure are directed to drills 100 having flutes 122 that are arranged in a generally helical configuration, it should be understood that the drills of the present disclosure may be configured with flutes having various other geometries without departing from the scope of the present disclosure. For example, it will be appreciated that the drills presently disclosed may be provided with parabolic flute configurations, without departing from the scope of the present disclosure.

In general, the gash contour 154 of embodiments according to the present disclosure extends along the base contour 124 a gash contour distance 160 measured from the chisel 148. The gash contour distance 160 may be affected by the gash radius 156, the axial rake 158, and/or a depth to which the gash contour 154 extends into the base contour 124. As depicted in the figures, embodiments according the present disclosure may exhibit gash contour distances 160 that are relatively long as compared to conventional drills. In some embodiments, the gash contour distance 160 may be greater than about 13% of the outer diameter 116 of the drill 100.

As previously mentioned, in the depicted embodiment, the gash contour 154 forms an unthinned length 151 of the cutting lip 150 that in some embodiments is about 10% of the thickness of the web 128, whereas in other embodiments is about equal to the thickness of the web 128.

Incorporation of the contoured drill point 142 having an arcuate portion 146 into the drill 100 may decrease the requisite application of a cutting force in an axial direction of the drill 100, as well as decrease the requisite application of a torque. The axial cutting force and torque requirements may vary based on the dimensions of the arcuate portion 144. For example, as the radius 148 increases within at least the above-referenced range, the axial cutting force needed to shear the workpiece and perform the material removal operation may decrease. Further, as the radius 148 increases within at least the above-referenced range, the torque necessary to shear the workpiece and perform the material removal operation may similarly decrease.

Additionally, the drills 100 that incorporate the contoured drill point 142 as described above have a reduced tendency to "walk" relative to the workpiece as compared to conventional drills. As such, the positional tolerance of multiple holes drilled within the workpiece may be improved as compared to multiple holes produced by a conventional drill. Further, the drills 100 that incorporate the contoured drill point 142 as described above produce holes that have measurably better concentricity and cylindricity as compared to holes produced by a conventional drill using equivalent material removal operation parameters.

Without being bound by theory, incorporation of the contoured drill point 142 as described herein may permit the drill 100 to target the application of shear force into the workpiece during the material removal operation. By targeting the application of shear force at the contoured drill point 142, the drill 100 is capable of forming a chip with lower applications of axial force and torque as compared to a conventional drill. In addition, the configuration of the cutting lip 150, the contoured drill point 142, and the gash contour 154 may provide this targeted application of shear force into the workpiece to efficiently form the chip by utilizing different shapes along various radial positions of the cutting lip 150. Drills according to the present disclosure may generate a first chip configuration, which is generated by the thinned portion of the cutting lip 150 that is formed by the gash contour 154 and the contoured drill point 142, and a second chip configuration, which is generated by the unthinned portion of the cutting lip 150 that is formed by the base contour 124 and the contoured drill point 142. Thus, the various described configurations of the cutting lip 150, the contoured drill point 142, and the gash contour 154 form a cutting edge that may accurately position the drill 100 for the material removal operation, efficiently shear material along the cutting lip 150, and direct the removed material away from the workpiece.

Because the drill 100 having the contoured drill point 142 as described herein may produce a chip with a lower application of axial cutting force and torque, the holes produced by the drill 100 may exhibit improved geometric characteristics as compared to holes produced by conventional drills. Further, by producing a chip with a lower application of axial force and torque, the heat generated by the interaction between the drill 100 and the workpiece may be lower, which may be beneficial for tool life and for the surface finish of the hole produced by the drill. Additionally, because the chisel 148 only extends to a position that is substantially proximate to the linear portions 144 of the contoured drill point 142, the chisel 148 may experience wear that is substantially similar to that experienced on the surrounding portions of the contoured drill point 142 (i.e., the chisel 148 may not experience substantially more wear than the surrounding portions of the contoured drill point 142).

It should be noted that the material properties of the work piece on which an end user will perform a material removal operation may govern the formation of the chip. Accordingly, the configuration of a particular material on which an end user will perform a material removal operation may exhibit different material properties than those detailed herein. To satisfy the requirements of the end user's material removal operation, various parameters of the drill may be modified to further increase the efficiency of the material removal operation.

Embodiments of drills 100 according to the present disclosure may be made with a variety of conventionally known materials that are suitable for a material removal operation. Such materials may include cemented tungsten carbide, including cemented cobalt tungsten carbide, and various grades of tool steel. In addition, the surfaces of the drill 100 may be coated with dissimilar materials to improve certain properties of the drill 100. Such coatings include ceramic coatings, such as TiN, TiC, and TiAlN.

In the depicted embodiments, the cutting edge 140 of the drill 100 is formed with the contoured drill point 142 and without a secondary clearance along the cutting edge 140. It should be understood that drills according to the present disclosure may include secondary clearances, for example, at radial orientations behind the contoured drill point 142 in the direction of drill rotation.

It should also be understood that drills according to the present disclosure include a plurality of lands that extend to a cutting edge, where the adjacent lands are separated by flutes having a base contour that is arranged in a generally helical configuration along a centerline of the drill. The drill also includes a plurality of contoured drill points arranged along the distal end of the drill. Each of the contoured drill points includes a linear portion that extends towards an outer diameter of the drill and an arcuate portion that extends from the linear portion towards a chisel of the drill. The drills also include gash contours that are positioned within the flutes and that extend from the chisels of the drills. The gash contours are oblique to the base contours of the flutes.

The drills according to the present disclosure provide for efficient formation of chips from a workpiece that reduces the requirement for axial force and torque applied to the drill during the material removal operation as compared to conventional drills. As further compared to conventional drills, drills according to the present disclosure may exhibit improved dimensional accuracy of placement of holes in the workpiece and improved concentricity and cylindricity.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the term "about" means plus or minus 10% of the numerical value of the number with which it is being used. Therefore, "about 40" means "in the range of 36 to 44." It should also be noted that the terms "generally" and "substantially" may be used herein to represent the inherent degree of uncertainty that may be attributed to any quantitative comparison, value, measurement, or other representation. These terms are also used herein to represent the degree by which a quantitative representation may vary from a stated reference without resulting in a change in the basic function of the subject matter at issue.

The terms "proximal" and "distal" are defined herein relative to an end user who is performing a material removal operation, for example, via a tool driver. The term "proximal" refers to the position of an element closer to the end user or the tool driver and the term "distal" refers to the position of an element further away from the end user or the tool driver. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The invention claimed is:

1. A drill, comprising:
   a plurality of lands that extend to a cutting edge, wherein adjacent lands are separated by flutes comprising a base contour arranged in a generally helical configuration along a centerline axis of a drill body;

a plurality of contoured drill points each comprising a linear portion that extends from an outer diameter of the drill body and an arcuate portion that extends from the linear portion and towards a chisel of the drill body, wherein the linear portion and the arcuate portion are evaluated viewing a normal to a plane that extends between the centerline axis of the drill body and a land of the plurality of lands, and wherein the linear portion and the arcuate portion of the contoured drill points are tangent with one another, wherein the chisel is formed from a convergence of all the arcuate portions; and a plurality of gash contours positioned within the plurality of flutes, the gash contours extending from the chisel of the drill body, wherein the gash contours are oblique to the base contours of the flutes.

2. The drill of claim 1, wherein the arcuate portion comprises a radius in a range from about 6% to about 25% of the outer diameter of the drill body.

3. The drill of claim 2, wherein the arcuate portion extends from about 5° to about 15°.

4. The drill of claim 1, wherein the drill body further comprises a cutting lip that is positioned at the cutting edge of the drill body and is formed between the intersection of the plurality of contoured drill points and the lands of the drill body.

5. The drill of claim 4, wherein the plurality of gash contours form an unthinned length of the cutting lip between the plurality of gash contours and the outer diameter of the drill body.

6. The drill of claim 5, wherein the linear portion and the arcuate portion of the contoured drill points adjoin one another at a transition and the unthinned length is located at a radial position outside of the transition.

7. The drill of claim 5, wherein the unthinned length is within about 10°/0 of a web thickness.

8. The drill of claim 4, wherein the cutting lip exhibits a linear or curved orientation when evaluated down the centerline axis of the drill body.

9. The drill of claim 4, wherein the cutting lip is generally curved when a region of the base contour is curved at a radial position that is outward from the centerline axis of the drill body.

10. The drill of claim 1, wherein the plurality of gash contours extend at an angle less than about 25 degrees relative to the base contour.

11. The drill of claim 1, wherein the plurality of gash contours exhibit a gash contour radius that is in a range from about 6% to about 25% of the outer diameter of the drill body.

12. The drill of claim 1, wherein the base contour and the plurality of gash contours are faceted relative to one another.

13. The drill of claim 1, wherein the drill comprises a material selected from the group consisting of tool steel and cemented tungsten carbide.

14. The drill of claim 1, wherein the linear portion exhibits a linear cross-section and the arcuate portion exhibits an arcuate cross section when evaluated along the plane.

15. The drill of claim 1, wherein the plurality of contoured drill points exhibit a generally conical arrangement having an axis of symmetry that corresponds to the centerline axis of the drill body.

16. The drill according to claim 1, wherein the plurality of contoured drill points each have a continuous surface and wherein the plane extends along the continuous surface between the centerline axis of the drill body and a land of the plurality of lands.

17. The drill according to claim 1, wherein the arcuate portion of each drill point is a concave surface.

18. A method of removing material from a workpiece, comprising:
plunging a drill into the workpiece, wherein the drill comprises:
a plurality of lands that extend to a cutting edge, wherein adjacent lands are separated by flutes comprising a base contour arranged in a generally helical configuration along a centerline axis of a drill body;
a plurality of contoured drill points each comprising a linear portion that extends from an outer diameter of the drill body, and an arcuate portion that extends from the linear portion and towards a chisel of the drill body, wherein the linear portion and the arcuate portion are evaluated viewing a normal to a plane that extends between the centerline axis of the drill body and a land of the plurality of lands and wherein the linear portion and the arcuate portion of the contoured drill points are tangent with one another, wherein the chisel is formed from a convergence of all the arcuate portions; and
a plurality of gash contours positioned within the plurality of flutes, the gash contours extending from the chisel of the drill body, wherein the gash contours are oblique to the base contours of the flutes;
forming a first chip configuration with a portion of a cutting lip formed by the gash contours and the contoured drill points; and
forming a second chip configuration with a portion of the cutting lip formed by the base contours and the contoured drill points.

19. The method of claim 18, wherein the arcuate portion comprises a radius in a range from about 6% to about 25% of the outer diameter of the drill body.

20. The method of claim 19, wherein the arcuate portion extends from about 5° to about 15°.

21. The method of claim 18, wherein the cutting lip is positioned at the cutting edge of the drill body and is formed between the intersection of the plurality of contoured drill points and the lands of the drill body, and wherein the plurality of gash contours form an unthinned length of the cutting lip between the plurality of gash contours and the outer diameter of the drill body.

* * * * *